United States Patent [19]
Vermeer

[11] Patent Number: 6,006,116
[45] Date of Patent: Dec. 21, 1999

[54] TIME-DIVISION RADIO THAT IS POWERED BY A LOW-POWER ENERGY SOURCE

[75] Inventor: Fulps Vincentinus Vermeer, Nieuwegien, Netherlands

[73] Assignee: Lucent Technologies, Inc., Murray Hill, N.J.

[21] Appl. No.: 08/946,962

[22] Filed: Oct. 8, 1997

[51] Int. Cl.[6] .................................................. H04B 1/38
[52] U.S. Cl. ......................................... 455/572; 455/573
[58] Field of Search .................................. 455/572, 573, 455/575, 574, 127, 90, 571

[56] References Cited

U.S. PATENT DOCUMENTS

| | | | |
|---|---|---|---|
| 5,149,985 | 9/1992 | Fujiwara | 455/345 |
| 5,594,951 | 1/1997 | Bellin | 455/89 |
| 5,627,882 | 5/1997 | Chien | 340/61 |
| 5,628,054 | 5/1997 | Osaka | 455/127 |
| 5,778,026 | 7/1998 | Zak | 455/343 |
| 5,806,006 | 9/1998 | Dinkins | 455/574 |
| 5,870,680 | 2/1999 | Guerlin | 455/557 |
| 5,898,932 | 4/1999 | Zurlo | 455/573 |

*Primary Examiner*—Curtis A. Kuntz
*Assistant Examiner*—Nick Corsaro

[57] ABSTRACT

A time-division radio is disclosed that can use a lower-power energy source than radios in the prior art. An illustrative embodiment of the present invention comprises a time-division transmitter that has a transmit mode and an idle mode, a primary energy storage device and a secondary energy storage device. The radio uses the secondary energy storage device as a kind of "power cache" in which to store power when it is in abundance and from which to draw power when it is scarce. When the transmitter is in idle mode, the primary energy storage device charges the secondary energy storage device and powers the transmitter. But when the transmitter is briefly in transmit mode, and, therefore, requires more power than the primary energy storage device alone can supply, the secondary energy storage device discharges to supplement the power from the primary energy storage device and satisfy the transmitter's power requirements.

24 Claims, 1 Drawing Sheet

TIME-DIVISION RADIO THAT IS POWERED BY A LOW-POWER ENERGY SOURCE

FIELD OF THE INVENTION

The present invention relates to wireless telecommunications in general, and, more particularly, to a time-division radio that is powered by a low-power energy source.

BACKGROUND OF THE INVENTION

The duration with which a wireless terminal (e.g., a cellular telephone, a hand-held data entry device, a cellular modem, a cordless telephone, a hand-held Global Positioning System receiver, etc.) can operate is limited by the product of two factors: (1) the power requirement of the wireless terminal, and (2) the capacity of the energy storage device that powers the wireless terminal.

Numerous technologies have been invented to reduce the power consumption of wireless terminals. These include, for example, the development of low-power CMOS devices and the development of time-division multiplexed/time-division multiple access ("TDM/TDMA") and time-division duplex ("TDD") protocols. TDM/TDMA and TDD protocols reduce power consumption by enabling a wireless terminal's radio transmitter to enter a low-power idle mode when the transmitter is not transmitting and the wireless terminal's radio receiver to enter a low-power idle mode when the receiver is not receiving.

For example, FIG. 1 depicts a block diagram of an illustrative wireless terminal that is typical of a time-division wireless terminal in the prior art. Wireless terminal 100 comprises: an energy storage device such as battery 101, time-division receiver 103 and time-division transmitter 105. Battery 101 is typically an electro-chemical energy storage device that powers receiver 103 and transmitter 105, in well-known fashion.

Time-division receiver 103 is compliant with a TDM/TDMA or TDD protocol, such as the IEEE 802.11 Wireless LAN protocol, in well-known fashion. The salient characteristic of receiver 103 is that it is always in either of one or two modes: receive mode or idle mode. When receiver 103 is in receive mode, it is capable of receiving RF signals from a remote transmitter and draws approximately 250 milliwatts from battery 101. When receiver 103 is in idle mode, it is not capable of receiving RF signals but only draws 5 milliwatts from battery 101. As is well-known in the prior art, the particular protocol to which wireless terminal 100 operates determines how and when receiver 103 toggles between receive mode and idle mode.

Time-division transmitter 105 is compliant with a TDM/TDMA or TDD protocol, such as the IEEE 802.11 Wireless LAN protocol, in well-known fashion. The salient characteristic of transmitter 105 is that it is always in either of one of two modes: transmit mode or idle mode. When transmitter 105 is in transmit mode, it is capable of transmitting RF signals to a remote receiver and draws approximately 300 milliwatts from battery 101. When transmitter 105 is in idle mode, it is not capable of transmitting RF signals but only draws 5 milliwatts from battery 101. As is well-known in the prior art, the particular protocol to which wireless terminal 100 operates determines how and when transmitter 105 toggles between transmit mode and idle mode.

Wireless terminal 100 can operate in either full-duplex or half-duplex mode. When wireless terminal 100 operates in full-duplex mode, both receiver 103 and transmitter 105 can operate simultaneously. Furthermore, receiver 103 can toggle between receive mode and idle mode independently of when transmitter 105 toggles between transmit mode and idle mode. In full-duplex mode the power drain on battery 101 can range from 10 milliwatts to 550 milliwatts.

In contrast, when wireless terminal 100 operates in half-duplex mode, either receiver 103 or transmitter 105 can operate, but not both simultaneously. Furthermore, neither receiver 103 nor transmitter 105 can toggle out of idle mode until the other has toggled into idle mode. In half-duplex mode the power drain on battery 101 can range from 10 milliwatts to 300 milliwatts.

Clearly, the duration with which wireless terminal 100 can operate is determined largely by the extent to which receiver 103 and transmitter 105 can remain in idle mode yet still provide an acceptable quality of service to the user of wireless terminal 100.

Another technique for lengthening the duration with which a wireless terminal can operate is to incorporate a longer-life battery into the wireless terminal. This is, however, not always practical because the market demand for a wireless terminal is based largely on the size and weight of the wireless terminal and a long-life battery is heavy and bulky and detracts from the marketability of the wireless terminal. There are, in fact, situations in which the form factor of the wireless terminal's radio simply will not accommodate a larger, longer-life battery. As is well-known in the art, the term "form factor" means the spatial dimensions that limit the size of a device.

Furthermore, there are situations in which the radio's form factor is so limiting that it is not possible to include both the radio and a battery that is large enough to merely power the radio into the allocated form factor. This is particularly true for the PCMCIA card or "PC" card form factor.

For example, when time-division receiver 103 and time-division transmitter 105 are designed to fit into a PCMCIA card form factor, time-division receiver 103 and time-division transmitter 105 may at times require up to 550 milliwatts, but the space remaining in the PCMCIA card for battery 101 may only leave enough room for a battery that can supply 200 milliwatts. Therefore, the need exists for a time-division radio whose transmitter and receiver can operate on a low-power battery.

SUMMARY OF THE INVENTION

Some embodiments of the present invention are capable of operating with a lower-power energy storage device than time-division radios in the prior art. In particular, some embodiments of the present invention are capable of operating with a small, low-power electro-chemical battery, which enables both the battery and a time-division radio to fit into a small form factor, such as a PCMCIA card.

An illustrative embodiment of the present invention comprises a time-division transmitter that has a transmit mode and an idle mode, a primary energy storage device and a secondary energy storage device. Typically, the primary energy storage device is capable of providing enough power to the transmitter when the transmitter is in idle mode, but is incapable of providing enough power to the transmitter when the transmitter is in transmit mode. That is not to say that the primary energy storage device does not have enough energy for the transmitter, only that the primary energy storage device is incapable of providing that energy to the transmitter quickly enough to satisfy the transmitter's need.

In other words, an understanding of the theory underlying the present invention requires an appreciation for the distinction between average power consumption and instantaneous power consumption. In accordance with the illustrative embodiment of the present invention it is unimportant that the primary energy storage device is incapable of satisfying the peak power requirement of the time-division transmitter as long as the primary energy storage device is capable of satisfying the average power requirement of the transmitter. The difficulty arises, therefore, not when the transmitter is in idle mode, but when it is in transmit mode. Therefore, the illustrative embodiment of the present invention uses the secondary energy storage device as a kind of "power cache" in which to store power when it is in abundance and from which to draw power when it is scarce.

When the transmitter is in idle mode, the primary energy storage device charges the secondary energy storage device and powers the transmitter. But when the transmitter is in transmit mode, and, therefore, requires more power than the primary energy storage device alone can supply, the secondary energy storage device discharges to supplement the power from the primary energy storage device to satisfy the transmitter's power requirements.

DETAILED DESCRIPTION

Figure 1:
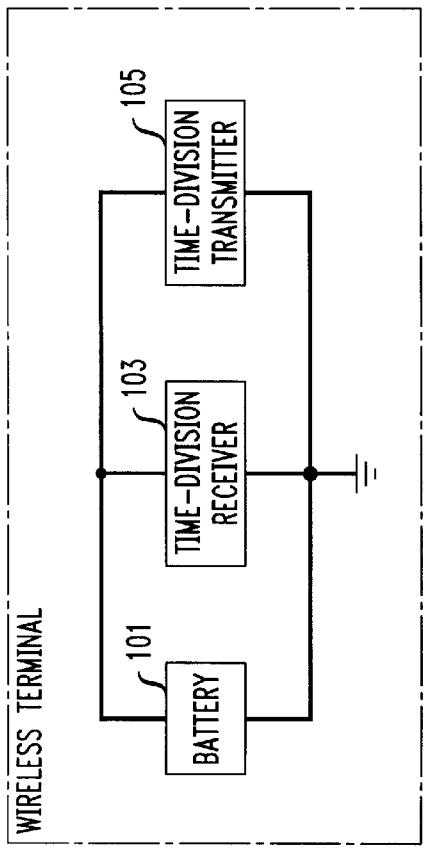
FIG. 1 depicts a block diagram of a time-division wireless terminal in the prior art.
Figure 2:
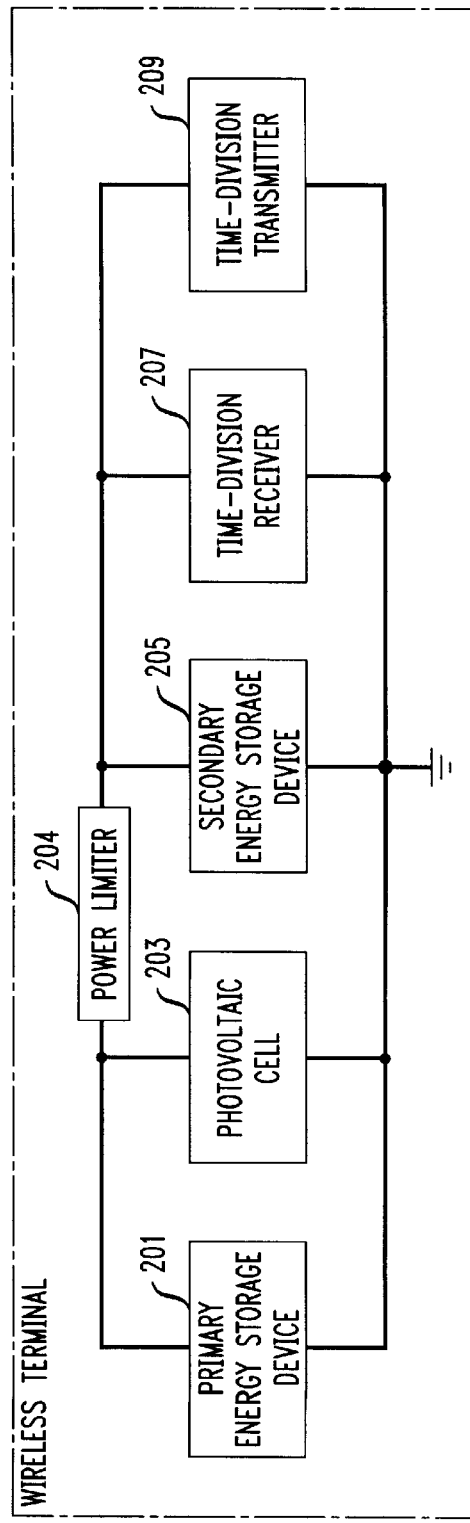
FIG. 2 depicts a block diagram of a time-division wireless terminal in accordance with an illustrative embodiment of the present invention.

FIG. 2 depicts a block diagram of wireless terminal 200 in accordance with an illustrative embodiment of the present invention. Wireless terminal 200 advantageously comprises: primary energy storage device 201, photovoltaic cell 203, power limiter 204, secondary energy storage device 205, time-division receiver 207 and time-division transmitter 209, all interconnected as shown.

Wireless terminal 200 advantageously complies with the IEEE 802.11 Wireless LAN protocol, in well-known fashion, which is a time-division duplex ("TDD") protocol. It will be clear to those skilled in the art how to make and use embodiments of the present invention that are compliant with other time-division duplex protocols and other time-division multiplexed/time-division multiple access protocols, whether they are full-duplex or half-duplex.

Primary energy storage device 201 is advantageously an electro-chemical battery that is capable of outputting an average of n milliwatts, in well-known fashion. The value of n can be determined in accordance with a formula that will be presented below.

Photovoltaic cell 203 advantageously supplements primary energy storage device 201, and can even re-charge primary energy storage device 201, in well-known fashion, when there is the chance that photovoltaic cell 203 will be exposed to light.

Time-division receiver 207 is advantageously compliant with the IEEE 802.11 Wireless LAN protocol, in well-known fashion, and is always in either one of two modes: receive mode or idle mode. When receiver 207 is in receive mode it is capable of receiving RF signals from a remote transmitter and draws $r_a$ milliwatts. When receiver 207 is in idle mode, it is not capable of receiving RF signals but draws only $r_i$ milliwatts. Receiver 207 toggles between receive mode and idle mode such that its duty cycle (i.e., the average amount of time it spends in receive mode with respect to the amount of time it spends in both receive and idle mode) is $dc_r$. Furthermore, it should be understood that receiver 207 can enter receive mode either periodically or sporadically, for varying durations, and that its duty cycle is determined based on the average amount of time it spends in receive mode, regardless of whether wireless terminal 200 is operating in full-duplex or half-duplex mode.

Time-division transmitter 209 is advantageously compliant with the IEEE 802.11 Wireless LAN protocol, in well-known fashion, and is always in either one or two modes: transmit mode or idle mode. When transmitter 209 is in transmit mode it is capable of transmitting RF signals to a remote receiver and draws $t_a$ milliwatts. When transmitter 209 is in idle mode, it is not capable of transmitting RF signals but draws only $t_i$ milliwatts. Transmitter 209 toggles between receive mode and idle mode such that its duty cycle (ie., the average amount of time it spends in transmit mode with respect to the amount of time it spends in both transmit and idle mode) is $dc_t$. Furthermore, it should be understood that transmitter 209 can enter transmit mode either periodically or sporadically, for varying durations, and that its duty cycle is determined based on the average amount of time it spends in receive mode, regardless of whether wireless terminal 200 is operating in full-duplex or half-duplex mode.

Because wireless terminal 200 is IEEE 802.11 Wireless LAN compliant, it operates in half-duplex mode and, therefore, receiver 207 cannot be in receive mode at the same time that transmitter 209 is in transmit mode. It will clear to those skilled in the art how to make and use other embodiments of the present invention that are full-duplex.

Secondary energy storage device 205 is advantageously either a rechargeable, electro-chemical battery or a capacitor, that has a low internal resistance and that can be charged by primary energy storage device 201 and photovoltaic cell 203. The purpose of secondary energy storage device 205 is to function as a "power cache." That is, secondary energy storage device 205 is to be charged by primary energy storage device 201 and photovoltaic cell 203 when there is an abundance of power available (i.e., when receiver 207 and transmitter 209 are each in idle mode) and to discharge when there is a shortage of power available (i.e., when either receiver 207 is in receive mode or transmitter 209 is in transmit mode).

Therefore, primary energy storage device 201 need not be large enough to supply the peak power demand of receiver 207 and transmitter 209: only that (1) primary energy storage device 201 be large enough to supply the average power demand of receiver 207 and transmitter 209, and (2) secondary energy storage device 205 be large enough so that secondary energy storage device 205 and primary energy storage device 201 are jointly capable of satisfying the peak power demand of receiver 207 and transmitter 209.

Power limiter 204 is advantageously an electric current limiter that limits the power that flows from primary energy storage device 201 and photovoltaic cell 203 to n milliwatts, in well-known fashion.

The values $r_a$, $r_i$, $dc_r$, $t_a$, $t_i$ and $dc_t$ are all summarized in the following table:

| Variable | Meaning |
| --- | --- |
| $r_a$ | power drawn by receiver 207 in receive mode |
| $r_i$ | power drawn by receiver 207 in idle mode |

-continued

| Variable | Meaning |
| --- | --- |
| $dc_r$ | duty cycle of receiver 207 |
| $t_a$ | power drawn by transmitter 209 in transmit mode |
| $t_i$ | power drawn by transmitter 209 in idle mode |
| $dc_t$ | duty cycle of transmitter 209 |
| n | average power output through power limiter 204 | and are related to the minimum average power, n, that primary energy storage device 201 must be capable of outputting by the following relation:

$$n = [(r_a * dc_r) + (r_i * (1 - dc_r))] + [(t_a * dc_t) + (t_i * (1 - dc_t))]$$

It will be clear to those skilled in the art how to make and use wireless terminal 200. It will also be clear to those skilled in the art that wireless terminal 200 can use any of many other well-known time-division protocols, in well-known fashion. Furthermore, it will be clear to those skilled in the art that, depending on the application, wireless terminal 200 need not comprise both receiver 207 and transmitter 209, but only one of them. For example, in telemetry applications, wireless terminal 200 may need not comprise receiver 207 and in broadcast receiver applications, wireless terminal 200 may need not comprise transmitter 209.

It is to be understood that the above-described embodiments are merely illustrative of the invention and that many variations may be devised by those skilled in the art without departing from the scope of the invention. It is therefore intended that such variations be included within the scope of the following claims.

What is claimed is:

1. An apparatus comprising:
   a time-division transmitter that has a transmit mode and an idle mode; and
   a primary energy storage device for providing energy to a secondary energy storage device when said time-division transmitter is in said idle mode and for providing energy to said time-division transmitter when said time-division transmitter is in said transmit mode;
   wherein said secondary energy storage device receives energy from said primary energy storage device when said time-division transmitter is in said idle mode and provides energy to said time-division transmitter when said time-division transmitter is in said transmit mode.

2. The apparatus of claim 1 wherein said primary energy storage device comprises a first electro-chemical battery and said secondary energy storage device comprises a second electro-chemical battery.

3. The apparatus of claim 1 wherein said primary energy storage device is supplemented by a photovoltaic cell.

4. The apparatus of claim 1 wherein said primary energy storage device comprises an electro-chemical battery and said secondary energy storage device comprises a capacitor.

5. An apparatus comprising:
   a time-division receiver that has a receive mode and a idle mode; and
   a primary energy storage device for providing energy to a secondary energy storage device when said time-division receiver is in said idle mode and for providing energy to said time-division receiver when said time-division receiver is in said receive mode;
   wherein said secondary energy storage device receives energy from said primary energy storage device when said time-division receiver is in said idle mode and provides energy to said time-division receiver when said time-division receiver is in said receive mode.

6. The apparatus of claim 5 wherein said primary energy storage device comprises a first electro-chemical battery and said secondary energy storage device comprises a second electro-chemical battery.

7. The apparatus of claim 5 wherein said primary energy storage device is supplemented by a photovoltaic cell.

8. The apparatus of claim 5 wherein said primary energy storage device comprises an electro-chemical battery and said secondary energy storage device comprises a capacitor.

9. An apparatus comprising:
   a time-division transmitter that has a transmit mode and a first idle mode;
   a time-division receiver that has a receive mode and a second idle mode; and
   a primary energy storage device for providing energy to a secondary energy storage device when said time-division transmitter is in said first idle mode and said time-division receiver is in said second idle mode, and for providing energy to said time-division transmitter when said time-division transmitter is in said transmit mode, and for providing energy to said time-division receiver when said time-division receiver is in receive mode;
   wherein said secondary energy storage device receives energy from said primary energy storage device when said time-division transmitter is in said first idle mode and said time-division receiver is in said second idle mode,
   wherein said secondary energy storage device provides energy to said time-division transmitter when said time-division transmitter is in said transmit mode, and
   wherein said secondary energy storage device provides energy to said time-division receiver when said time-division receiver is in receive mode.

10. The apparatus of claim 9 wherein said primary energy storage device comprises a first electro-chemical battery and said secondary energy storage device comprises a second electro-chemical battery.

11. The apparatus of claim 9 wherein primary energy storage device is supplemented by a photovoltaic cell.

12. The apparatus of claim 9 wherein said primary energy storage device comprises a first electro-chemical battery and said secondary energy storage device comprises a capacitor.

13. A method comprising the steps of:
   powering a time-division transmitter with a primary energy storage device and a secondary energy storage device while said time-division transmitter is in a transmit mode;
   charging said secondary energy storage device with said primary energy storage device while said time-division transmitter is in an idle mode; and
   powering said time-division transmitter with said primary energy storage device while said time-division transmitter is in said idle mode.

14. The method of claim 13 wherein said primary energy storage device comprises a first electro-chemical battery and said secondary energy storage device comprises a second electro-chemical battery.

15. The method of claim 13 wherein said primary energy storage device is supplemented by a photovoltaic cell.

16. The method of claim 13 wherein said primary energy storage device comprises an electro-chemical battery and said secondary energy storage device comprises a capacitor.

17. A method comprising the steps of:

powering a time-division receiver with a primary energy storage device and a secondary energy storage device while said time-division receiver is in a receive mode;

charging said secondary energy storage device with said primary energy storage device while said time-division receiver is in an idle mode; and powering said time-division receiver with said primary energy storage device while said time-division receiver is in said idle mode.

18. The method of claim 17 wherein said primary energy storage device comprises a first electro-chemical battery and said secondary energy storage device comprises a second electro-chemical battery.

19. The method of claim 17 The method of claim 11 wherein said primary energy storage device is supplemented by a photovoltaic cell.

20. The method of claim 17 wherein said primary energy storage device comprises an electro-chemical battery and said secondary energy storage device comprises a capacitor.

21. A method comprising the steps of:

powering a time-division receiver with a primary energy storage device and a secondary energy storage device while said time-division receiver is in a receive mode;

powering a time-division transmitter with said primary energy storage device and said secondary energy storage device while said time-division transmitter is in a transmit mode;

charging said secondary energy storage device with said primary energy storage device while said time-division receiver and said time-division transmitter are both in an idle mode; and powering said time-division receiver and said time-division transmitter with said primary energy storage device while said time-division receiver and said time-division transmitter are both in said idle mode.

22. The method of claim 21 wherein said primary energy storage device comprises a first electro-chemical battery and said secondary energy storage device comprises a second electro-chemical battery.

23. The method of claim 21 wherein said primary energy storage device is supplemented by a photovoltaic cell.

24. The method of claim 21 wherein said primary energy storage device comprises an electro-chemical battery and said secondary energy storage device comprises a capacitor.

* * * * *